United States Patent
Hüthwohl et al.

(10) Patent No.: US 6,613,292 B1
(45) Date of Patent: Sep. 2, 2003

(54) CONVERTER FOR A DEVICE FOR INTRODUCING AMMONIA INTO EXHAUST GAS FLOW OF INTERNAL COMBUSTION ENGINE AND METHOD FOR FILLING CONVERTER

(75) Inventors: Georg Hüthwohl, Soest (DE); Bernd Maurer, Balve (DE)

(73) Assignee: HJS Fahrzeugtechnik GmbH & Co., Menden (DE)

( * ) Notice: Subject to any disclaimer, the term of this patent is extended or adjusted under 35 U.S.C. 154(b) by 0 days.

(21) Appl. No.: 09/528,425

(22) Filed: Mar. 17, 2000

(30) Foreign Application Priority Data

Mar. 19, 1999 (DE) .......................... 199 12 374

(51) Int. Cl.[7] .................... B01D 53/56; B01D 53/94; F01N 3/20
(52) U.S. Cl. .................... 422/172; 422/171; 422/173; 422/239
(58) Field of Search .................... 422/168–173, 422/239, 242; 423/239.1, 237

(56) References Cited

U.S. PATENT DOCUMENTS 6,301,879 B1 * 10/2001 Weisweiler et al. ........... 60/274
6,399,034 B1 * 6/2002 Weisweiler ................ 423/13.2

FOREIGN PATENT DOCUMENTS

| DE | 19720209 | 6/1998 |
| WO | WO 98/51402 | * 11/1998 |

* cited by examiner

Primary Examiner—Hien Tran
(74) Attorney, Agent, or Firm—Flanagan & Flanagan; John R. Flanagan

(57) ABSTRACT

A converter for a device for supplying ammonia ($NH_3$) into the exhaust gas flow of a combustion engine comprising a pressure-tight reaction vessel 2 for generating $NH_3$ by heating a substance thermolytically separating $NH_3$ under the effect of heat, and a heating unit 10 for heating the reaction vessel 2 to the operating temperature for generating the $NH_3$, is defined thereby that the reaction vessel 2 usefully comprises in the region of its bottom an outlet 4 provided with connection means and an inlet 3, spaced apart from the outlet 4, also provided with connection means, with which connection means the interior of the reaction vessel 2 is connectable to a filling and withdrawal unit 13 for drawing off a carrier medium disposed in the reaction vessel 2, and for filling the reaction vessel 2 with new substance thermolytically separating $NH_3$ transported by the carrier medium.

4 Claims, 2 Drawing Sheets

CONVERTER FOR A DEVICE FOR INTRODUCING AMMONIA INTO EXHAUST GAS FLOW OF INTERNAL COMBUSTION ENGINE AND METHOD FOR FILLING CONVERTER

BACKGROUND OF THE INVENTION

1. Field of the Invention

The invention relates to the field of reducing by means of a catalyst primary injurious substances generated in internal combustion engines. Within the scope of such a primary injurious substance-reducing system the invention relates in particular to a converter for a device for introducing ammonia ($NH_3$) into the exhaust gas flow of an internal combustion engine, comprising a pressure-tight reaction receptacle for generating $NH_3$ by heating a substance which thermolytically separates $NH_3$ in the presence of heat and a heating unit for heating the reaction receptable operating temperature for generating the $NH_3$. The invention relates further to a process for filling such a converter while it is at its operating temperature with new, unconsumed substance splitting off $NH_3$.

2. Description of the Prior Art

Apart from carbon monoxide (CO) and hydrocarbons (HC), in particular the nitric oxides ($NO_x$) are among the environmentally harmful, directly emitted, primary injurious substances which are generated during the operation of internal combustion engines, in particular Diesel engines. The use of three-way catalysts, such as are used in Otto engines and gas engines, cannot be used in the exhaust of Diesel engines due to the presence of an oxygen excess. For this reason, for the reduction of the nitric oxide emission in Diesel engines a selectively operating SCR catalyst (Selective Catalytic Reduction Catalyst) has been developed in which, in the presence of an added reducing agent, namely ammonia ($NH_3$), the expelled nitric oxides are reduced to $N_2$ and $H_2O$.

A device according to the species for introducing ammonia into the exhaust gas flow of an internal combustion engine of a motor vehicle is known from DE 197 20 209 C1 by the applicant. Such a denoxing unit comprises a converter in which is disposed a substance thermolytically separating $NH_3$ or a substance mixture thermolytically separating $NH_3$. The substance can be ammonium carbamate, for example. The converter is connected with the exhaust gas line of a Diesel engine via a feed line with the feed line terminating in the exhaust gas line before the input side of an SCR catalyst. A clocked valve is provides as a dosing device which is driven by a control unit such that, as a function of specific motor operation characteristics, the requisite quantity of $NH_3$ can be injected into the exhaust gas flow. The converter substantially comprises a pressure-tight reaction vessel encompassed by a heating device implemented as a heating coil. The heating device is integrated into the cooling water circulation of the Diesel engine via an inlet conduit and a drain conduit.

By heating the ammonium carbamate which is used, for example, as the substance thermolytically separating $NH_3$, it is broken down into $NH_3$ and $CO_2$. This gas mixture collects in the pressure-tight reaction vessel until the build-up of a corresponding internal pressure. When a specific internal pressure has been reached in the reaction vessel, an equilibrium state is established such that no further ammonium carbamate is broken down. Under operating conditions of the engine, in which the cooling water flowing through the heating device, as a rule, has a temperature between 80 and 100° C., in the reaction vessel a pressure obtains corresponding to the state of equilibrium, which for ammonium carbamate is approximately 8 bar. In order for a sufficient quantity of $NH_3$ to be provided, for injection into the exhaust gas flow through the converter, it must store a specific minimum quantity of substance thermolytically separating $NH_3$ or $NH_3$ separated from it. For this reason the device cannot be operated for a length of time sufficient for the entire substance thermolytically separating $NH_3$ to be gasified and the internal pressure in the reaction vessel has in this way is degraded. Opening the reaction vessel in this state for replenishing it with new, unconsumed substance, thermolytically separating $NH_3$, cannot readily take place due to the internal pressure. Even if one were to wait until the converter has cooled down again to ambient temperatures and thereby the internal pressure has also been lowered in order to open the reaction vessel, a certain residual pressure remains in the converter especially if the ambient temperatures, such as for example during the summer, are relatively high. Moreover, such a cooling requires too much time and cannot be carried out within the scope of normal fueling of the motor vehicle.

SUMMARY OF THE INVENTION

Building on the discussed prior art, the invention is therefore based, for one, on the task of further developing a converter according to the species for a device for supplying ammonia into the exhaust gas flow of a combustion engine such that it can readily be filled with new substance which thermolytically separates $NH_3$ at its normal operating temperatures and within the time frame of normal motor vehicle fueling.

The invention is further based on, the task of providing a method for filling such a converter when it is at its operating temperature with new, unconsumed substance which thermolytically separates $NH_3$.

The first-mentioned task is solved according to the invention thereby that the reaction vessel comprises an outlet, provided with connection means and an inlet, also provided with connection means and spaced apart from the outlet, with which connection means the interior of the reaction vessel can be connected to a filling and withdrawal unit of a carrier medium disposed in the reaction vessel and for filling the reaction vessel with new substance which thermolytically separates $NH_3$, transported by the carrier medium.

The second-mentioned task is solved according to the invention through a method for filling a converter containing a substance at operating temperature for a device for supplying $NH_3$ into the exhaust gas flow of a combustion engine, comprising a pressure-tight reaction vessel containing the substance which thermolytically separates $NH_3$, a heating unit for heating the reaction vessel to operating temperature and means for supplying the separated $NH_3$ into the exhaust gas flow of the combustion engine, comprising the following steps:

Connecting the reaction vessel to a filling and withdrawal unit, with the interior of the reaction vessel being brought into connection with the filling unit via an inlet and with the withdrawal unit via an outlet, Filling of the reaction vessel with new substance which thermolytically separates $NH_3$ using a liquid or gaseous carrier medium transporting the substance thermolytically separating $NH_3$, which neither dissolves nor chemically binds the $NH_3$ separated from the substance thermolytically separating $NH_3$, which carrier medium is introduced through the inlet into the reaction vessel with the simultaneous drawing off of a quanity of the carrier medium through the outlet after a separation of the substance which thermolytically separates $NH_3$ from the quantity of carrier medium to be drawn off, and After filling the reaction vessel, separating the reaction vessel from the filling and withdrawal unit.

In the case of the converter according to the invention it is provided to structure the reaction vessel with an inlet and with an outlet with the outlet usefully being disposed in the region of the bottom of the reaction vessel. The inlet as well as also the outlet are provided with connection means which permit a connection of the inlet and of the outlet to a filling and withdrawal unit. Usefully the filling and withdrawal unit is disposed stationarily—such as the gasoline pump of a filling station. A converter connectable in this manner to a filling and withdrawal unit permits the use of a;carrier medium for filling the converter with new, unconsumed substance thermolytically separating $NH_3$, with this substance being introduced into the reaction vessel through the carrier medium via the inlet. Simultaneously with the introduction of the new substance, carrier medium is drawn from the outlet which, before it is drawn off from the outlet, had been separated from the substance which thermolytically separates $NH_3$ entrained by the carrier medium.

Due to the possibility of connecting the reaction vessel to a filling and withdrawal unit, by introducing a carrier medium into the reaction vessel, the latter can be filled with new substance thermolytically separating $NH_3$, without in principle a preceding pressure degradation being necessary for this purpose. The filling of the reaction vessel can thus also be carried out while substantially maintaining the internal pressure obtaining in the reaction vessel.

In the case of such a converter, further, the possibility exists that it can be integrated into a cooling means circulation in which, via the inlet, coolant can be introduced into the reaction vessel and be drawn off from the outlet in the heated state after it has flown through the reaction vessel. This circulation can be formed by the filling and withdrawal unit such that after sufficient cooling of the reaction vessel, new substance thermolytically separating $NH_3$ can be introduced with the carrier medium into the reaction vessel. It is therein useful that the coolant and the carrier medium are identical. With this type of refilling of the converter, the reaction vessel also does not need to be opened.

An advantageous embodiment provides that the coolant and the carrier medium are an identical fluid, for example oil. The use of a liquid coolant is useful since through the higher heat capacity of a liquid compared to a gas, a more rapid cooling of the reaction vessel can be achieved.

By providing a liquid carrier medium—a carrier liquid—it is provided that in the reaction vessel, after it has been filled with new substance splitting off $NH_3$, a specific quantity of carrier liquid remains in the reaction vessel. Heating the substance thermolytically separating $NH_3$, which is disposed within the carrier liquid, for example in the form of small spheres or also as a suspension, takes place very much more rapidly and more uniformly since the heating of the interior of the reaction vessel does not take place through heat radiation but substantially through heat conduction.

If it is provided that the reaction vessel is newly filled without preceding cooling and concomitant pressure degradation, the connection means of the inlet or of the outlet are equipped with corresponding auxiliary means. Such auxiliary means, for the inlet can be a one-way valve and for the outlet a pressure reducing valve whose high-pressure side is disposed such that it is directed toward the reaction vessel.

When using a liquid as the carrier medium, a separation of the thermolytically separating $NH_3$ from the carrier liquid takes place, for example, by connecting in series a filter before the outlet. The substance, for example ammonium carbamate, thermolytically separating $NH_3$ is flushed with the carrier liquid, for example an oil, into the reaction vessel in the form of small spheres or pellets and remains in the reaction vessel at a predetermined level of the liquid. It can be provided that between the provided liquid level of the carrier liquid with the substance thermolytically separating $NH_3$ and a superjacent reaction vessel region, in which the thermolytically separates reaction gas, namely $NH_3$ or an $NH_3$ gas mixture accumulates, a membrane permeable to $NH_3$ is disposed. Such a division, moreover, has the advantage that the membrane acts in the manner of a baffle such that the liquid in the reaction vessel is held quasi-stationarily in the reaction vessel.

As the carrier medium such gaseous or also liquid.substances or,mixtures of substances can be provided which do not dissolve thermolytically separated $NH_3$ or bind it chemically in other ways. Further, the carrier medium used should also not be able to dissolve the substance thermolytically separating $NH_3$. However, it can be provided that the carrier medium binds the further substances or substance mixtures formed in the thermolytic $NH_3$ cleavage. In this way, pure $NH_3$ can be drawn off at the output side of the converter for supplying it into the exhaust gas flow of the combustion engine.

BRIEF DESCRIPTION OF THE DRAWINGS

Further advantages of the invention are an integral part of the further dependent claims as well as the following description of an embodiment example with reference to the enclosed Figures. Therein depict:

DETAILED DESCRIPTION OF THE INVENTION

Figure 1:
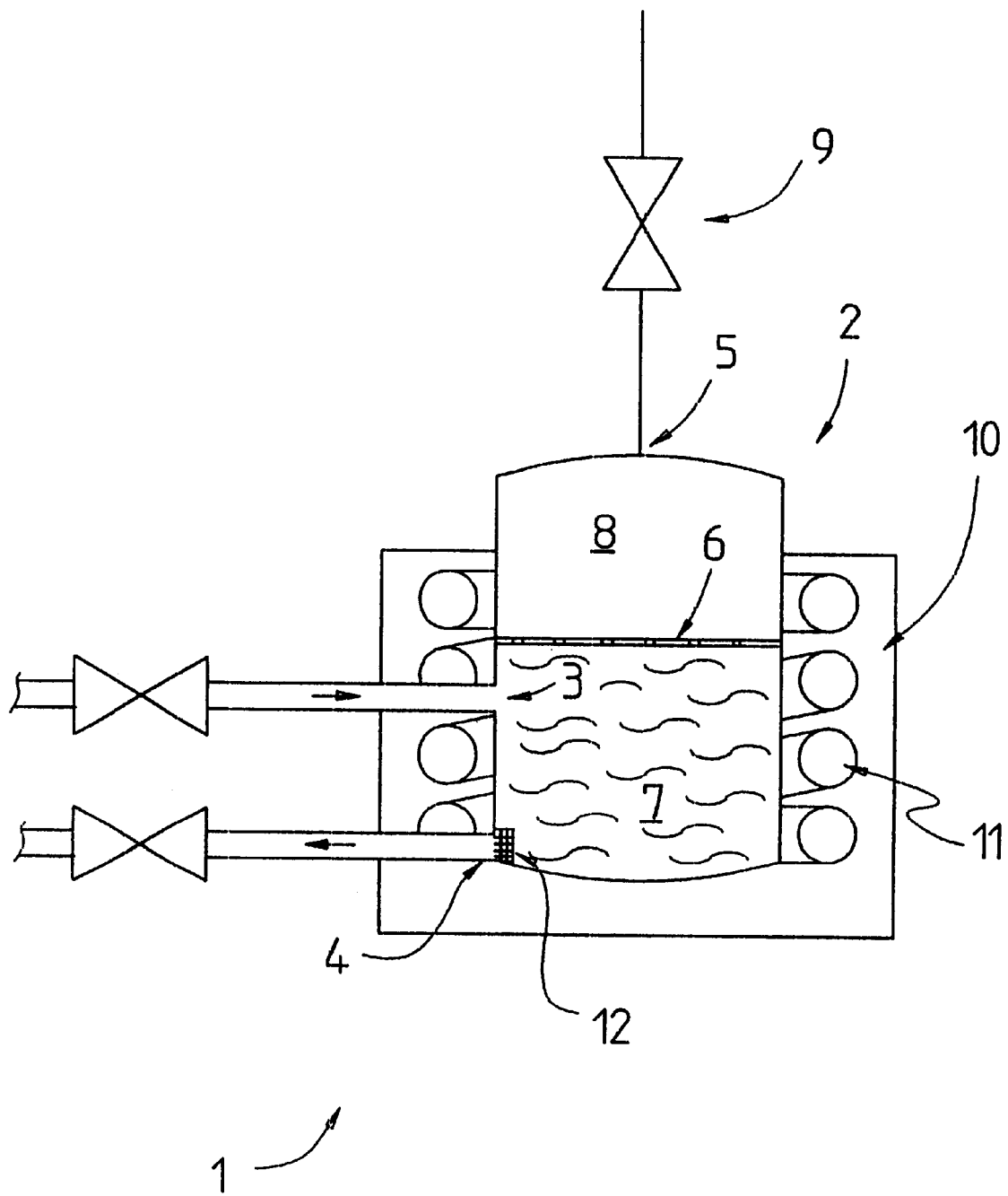
FIG. 1: a schematic sectional representation of a converter for a device for supplying $NH_3$ into the exhaust gas flow of a combustion engine.

Referring to FIG. 1, there is depicted a converter 1 of a denoxing unit, not further shown, for denoxing exhaust gases of a Diesel engine. The converter 1 comprises a pressure-tight reaction vessel 2 which includes an inlet 3 for introducing a carrier fluid mixed with new, unconsumed substance thermolytically separating $NH_3$, an outlet 4 for drawing off the carrier fluid and a further outlet 5 for drawing, off $NH_3$ separated from the substance, for example ammonium carbamate, $NH_3$ under the effect of heat. The outlet 4 is disposed in the region of the bottom of the reaction vessel 2 such that through the outlet 4 substantially the entire reaction vessel 2 can be emptied. The inlet 3 is spaced apart from outlet 4 and disposed such that the introduction of the carrier medium causes a turbulent flow in the reaction vessel 2. The reaction vessel 2 is divided by a membrane 6 into an educt region 7 and a product region 8. The membrane 6 is permeable to the gas phases formed during the decomposition of the substance thermolytically separating $NH_3$ such that these accumulate after their cleavage in the product on 8 of the reaction vessel 2. A portion of this product gas mixture is $NH_3$. A pressure reducing valve 9 is disposed at the outlet 5 of the reaction vessel 2.

Associated with the converter 1 is further a heating unit 10 which in the embodiment example depicted in the Figures is formed by a heating coil 11. The heating coil 11 is connected to the small cooling water circulation of the Diesel engine in a manner not further shown and is thus heated rapidly when operation of the Diesel engine is started.

Preceding the outlet 4 is a filter body 12 such that when the carrier fluid is drawn from the reaction vessel 2, substance thermolytically separating $NH_3$ still present in the educt region 7 is not also drawn off together with it.

Figure 2:
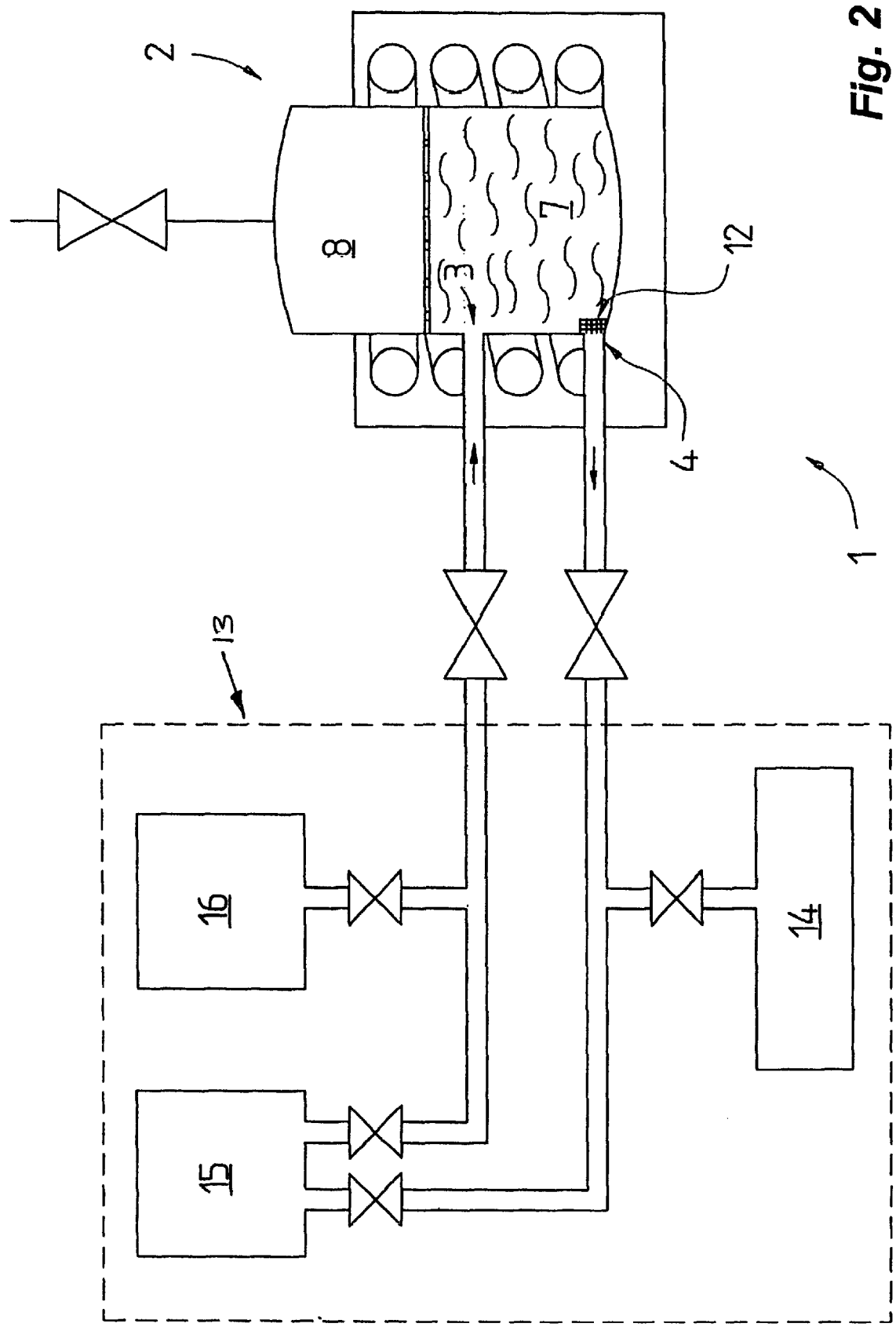
FIG. 2: the converter of FIG. 1 connected to a filling and withdrawal unit.

With the inlet 3 and the outlet 4 are associated connection means not further shown, in order for the conduit pieces forming the inlet 3 and the outlet 4 to be connectable to a filling and withdrawal unit, generally designated 13. For this purpose the conduit pieces can be disposed in the region of such a coupling concentrically with respect to one another such that a coupling piece associated with the filling and withdrawal unit 13 can also be constructed with double tubes so as to be concentric. The connection of the two free connection means can take place through a bayonet-type closure. Such a filling and withdrawal unit 13 is shown schematically in FIG. 2, to which is corrected the converter 1 of FIG. 1 filling and withdrawal unit 13 comprises a withdrawal tank 14, a coolant tank 15, and a reservoir tank 16, in which the substance thermolytically separating $NH_3$ concentrated in a carrier fluid. The pumps necessary for operating the filling and withdrawal unit 13 are not shown in FIG. 2 for the sake of clarity.

In a first step for filling the converter 1 when it is at operating temperature, connection is established between a conduit coupling associated with the filling and withdrawal unit 13 and a corresponding counterpiece on the motor vehicle. To the counterpiece on the motor vehicle the conduit pieces representing the inlet 3 and the outlet 4 are connected. In the reaction vessel 2 an excess pressure obtains at the point in time at which the conduit connection is established such that the provided connection means are layed out correspondingly. Immediately after establishing the conduit connection, through outlet 4 of the reaction vessel 2 carrier fluid is drawn off. This can take place for example solely by opening corresponding valves for permitting a fluid connection between the reaction vessel 2 and the withdrawal tank 14 with the excess pressure obtaining in the reaction vessel 2 automatically bringing about the outflow of a specific quantity of carrier fluid. Remaining residues of the substance thermolytically separating $NH_3$ are left in the educt region 7 of the reaction vessel 2 since these are filtered out by the filter body 12. In the embodiment example shown in FIG. 2 it is provided that a filling is to take place only after the reaction vessel has cooled down. For this purpose, after a pressure degradation of the reaction vessel 2, a circulation is established with the coolant tank 15 such that the educt region 7 of the reaction vessel 2 now is flushed and cooled with a coolant which usefully corresponds to the employed carrier fluid. Due to the provided turbulent inflow of the cooling fluid into the reaction vessel 2, a rapid cooling down of the reaction vessel 2 occurs. Immediately after cooling down the reaction vessel 2, a refilling takes place by introducing a predetermined quantity of the substance thermolytically separating $NH_3$ from the reservoir tank 16. This can take place either in the concentration provided in the reservoir tank 16 or also after dilution with a predetermined quantity of cooling fluid. If the predetermined quantity of the substance thermolytically separating $NH_3$ has been flushed with the carrier medium into the reaction vessel 2, it is useful for cleaning the valves and connection means used that in a last filling solely a specific quantity of the carrier fluid is introduced into the reaction vessel 2. Thereby the valves and the connection means are flushed such that in them no residues are contained of the substance thermolytically separating $NH_3$. The valves are saved since subsequently in the medium to be conducted, namely solely carrier fluid, no solid material is any longer present. It is furthermore avoided that in the conduits associated with the filling and withdrawal unit 13, due to residues of the substance thermolytically separating $NH_3$ disposed therein through decomposition of this substance, a pressure builds such as would be possible, for example, on hot summer days.

Filling of the converter under pressure with the assurance of flushing of the connection conduits as well as of the valves and the connection means can be carried out, for example, as follows. In the reaction vessel 2 a compressible volume can be disposed which becomes compressed when a given pressure is exceeded. The reaction vessel 2 can be, for example, at a pressure of 5 bar. The filling process is stopped when no further transport medium is transported at this pressure. Switching from the carrier medium transporting the substance thermolytically separating $NH_3$ to the pure carrier medium, the pressure is increased to 8 bar such that the volume disposed in the reaction vessel 2 is compressed and thereby additional substance thermolytically separating $NH_3$ is introduced from the conduits into the reaction vessel 2. Thereby the supply line, the valves and the connection means are rinsed such that in them no residues of the substance thermolytically separating $NH_3$ any longer present.

After such, a refilling of the converter 1 the conduit connection is separated and the converter 1 can again assume its operating temperature.

For the described tanking process only as much time is required as is taken up by the fuelling of a motor vehicle.

As the substance thermolytically separating $NH_3$ any substance or any substance mixture which releases $NH_3$ at relatively low temperatures. As the substance thermolytically separating $NH_3$, ammonium carbamate is preferably used.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

What is claimed is:

1. Converter for a device for supplying ammonia ($NH_3$) into the exhaust gas flow of a combustion engine, comprising a pressure-tight reaction vessel (2) for generating $NH_3$ by heating a substance splitting off $NH_3$ under the effect of heat, and a heating unit (10) for heating the reaction vessel (2) to operating temperature for generating the $NH_3$, characterized in that the reaction vessel (2) comprises an outlet (4), provided with connection means, and an inlet (3), spaced apart from the outlet (4), also provided with connection means, with which connection means the interior of the reaction vessel (2) is connectable to a filling and withdrawal unit (13) for drawing off a carrier medium disposed in the reaction vessel (2) and for filling the reaction vessel (2) with new substance splitting off $NH_3$ transported by the carrier medium wherein the interior of the reaction vessel (2) is divided by a membrane (6) permeable to $NH_3$ into a lower region (7) containing the carrier medium with the substance splitting off $NH_3$ and an upper region (8) containing the split-off $NH_3$.

2. Converter as claimed in claim 1, characterized in that the connection means of outlet (4) and inlet (3) are disposed concentrically with respect to one another.

3. Converter as claimed in claim 1, characterized in that the connection means associated with the outlet (4) includes a pressure reducing valve directed with its high-pressure side toward the reaction vessel (2).

4. Converter as claimed in claim 2, characterized in that the connection means associated with the outlet (4) includes a pressure reducing valve directed with its high-pressure side toward the reaction vessel (2).

* * * * *